US009407415B2

(12) United States Patent
Chen et al.

(10) Patent No.: US 9,407,415 B2
(45) Date of Patent: Aug. 2, 2016

(54) METHOD AND DEVICE FOR SENDING AND RECEIVING ACKNOWLEDGEMENT

(71) Applicant: HUAWEI TECHNOLOGIES CO., LTD., Shenzhen (CN)

(72) Inventors: Xiaobo Chen, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 14/177,515

(22) Filed: Feb. 11, 2014

(65) Prior Publication Data

US 2014/0153528 A1 Jun. 5, 2014

Related U.S. Application Data

(63) Continuation of application No. PCT/CN2012/079904, filed on Aug. 10, 2012.

(30) Foreign Application Priority Data

Aug. 15, 2011 (CN) .......................... 2011 1 0232590

(51) Int. Cl.
*H04L 5/00* (2006.01)
*H04L 1/18* (2006.01)
(Continued)

(52) U.S. Cl.
CPC ............ *H04L 5/0055* (2013.01); *H04L 1/1607* (2013.01); *H04L 1/1812* (2013.01);
(Continued)

(58) Field of Classification Search
CPC ........... H04L 1/16; H04L 1/1607; H04L 5/00; H04W 72/04
See application file for complete search history.

(56) References Cited

U.S. PATENT DOCUMENTS

2009/0268685 A1* 10/2009 Chen .................... H04L 1/1854
370/329
2010/0172308 A1 7/2010 Nam et al. .................... 370/329
(Continued)

FOREIGN PATENT DOCUMENTS

CN 101420293 A 4/2009
CN 101527623 A 9/2009
(Continued)

OTHER PUBLICATIONS

Extended and Supplementary European Search Report issued on Dec. 15, 2014 in corresponding European Patent Application No. 12824543.8.
(Continued)

*Primary Examiner* — Andrew Lai
*Assistant Examiner* — Leon Andrews
(74) *Attorney, Agent, or Firm* — Staas & Halsey LLP

(57) ABSTRACT

A method for sending an acknowledgement includes: sending first subframe ratio information and second subframe ratio information to a UE; reserving a first PHICH resource set in a first acknowledgement subframe set; reserving a second PHICH resource set in an acknowledgement subframe, in which the first PHICH resource set does not exist, of a second acknowledgement subframe set; receiving uplink data sent by the UE; determining an acknowledgement subframe for the uplink data; and sending an acknowledgement to the UE by using a PHICH resource in the first PHICH resource set if the first PHICH resource set exists in the acknowledgement subframe, or sending an acknowledgement to the UE by using a PHICH resource in the second PHICH resource set if the first PHICH resource set does not exist in the acknowledgement subframe. PHICH resource overhead of a system is lowered and data transmission for the user equipment is ensured.

18 Claims, 4 Drawing Sheets

(51) Int. Cl.
    *H04L 1/16*     (2006.01)
    *H04W 72/12*     (2009.01)

(52) U.S. Cl.
    CPC ............ *H04L1/1854* (2013.01); *H04L 1/1861* (2013.01); *H04L 1/1864* (2013.01); *H04W 72/1263* (2013.01)

(56) References Cited

U.S. PATENT DOCUMENTS

2012/0113945 A1    5/2012    Moon et al.
2012/0257554 A1    10/2012    Kim et al.

FOREIGN PATENT DOCUMENTS

| | | |
|---|---|---|
| CN | 102104459 A | 6/2011 |
| CN | 102130712 A | 7/2011 |
| EP | 2 663 008 A1 | 11/2013 |
| WO | WO 2011/049368 A2 | 4/2011 |
| WO | WO 2011/078581 A2 | 6/2011 |

OTHER PUBLICATIONS

International Search Report mailed Nov. 29, 2012 in corresponding International Patent Application No. PCT/CN2012/079904.

R1-091240 "PHICH Mapping in Asymmetric Carrier Aprgegation," *3GPP TSG RAN WG1 Meeting #56bis*, Mar. 23-27, 2009, pp. 1-3, Agenda Item 15.4, Samsung; Seoul, Korea.

"3rd Generation Partnership Project Technical Specification Group Radio Access Network; Evolved Universal Terrestrial Redid Access (E-UTRA); Physical Channels and Modulation (Release 10)," *3GPP TS 36.211 V10.1.0 (Mar. 2011) Technical Specificaton*, 2011, pp. 1-115, 3rd Generation Organizational Partners.

"3rd Generation Partnership Project; Technicai Specification Group Radio Access Network; Evolved Universal Terrestrial Radio Access (E-UTRA); Physical layer procedures (Reiease 10)," *3GPP TS 36.213 V10.1.0 (Mar. 2011) Technical Specification*, 2011, pp. 1-115, 3rd Generation Organizational Partners.

International Search Report issued Nov. 29. 2012, in corresponding international Patent Application No. PCT/CN2012/079904.

R1-091240, "PHICH Mapping in Asymmetric Carrier Aggregation," *3GPP TSG RAN WG1 Meeting #56bis*, Mar. 23-27, 2009, pp, 1-3, Agenda Item 15.4, Samsung; Seoul, Korea.

"3rd Generation Partnership Project Technical Specification Group Radio Access Network; Evolved Universal Terrestrial Radio Access (E-UTRA); Physical Channels and Modulation (Release 10)," *3GPP TS 36.211 V10.1.0 (Mar. 2011) Technical Specificaton*, 2011, pp. 1-103, 3rd Generation Organizational Partners.

"3rd Generation Partnership Project Technical Specification Group Radio Access Network; Evolved Universal Terrestrial Radio Access (E-UTRA); Physical layer procedures (Release 10)," *3GPP TS 36.213 V10.1.0 (Mar. 2011) Technical Specificaton*, 2011, pp. 1-115, 3rd Generation Organizational Partners.

International Search Report issued Nov. 29, 2012, in corresponding International Patent Application No. PCT/CN2012/079904.

\* cited by examiner

METHOD AND DEVICE FOR SENDING AND RECEIVING ACKNOWLEDGEMENT

CROSS-REFERENCE TO RELATED APPLICATIONS

This application is a continuation of International Application No. PCT/CN2012/079904, filed on Aug. 10, 2012, which claims priority to Chinese Patent Application No. 201110232590.7, filed on Aug. 15, 2011, both of which are hereby incorporated by reference in their entireties.

TECHNICAL FIELD

The present invention relates to the field of communications technologies, and in particular, to a method and a device for sending and receiving an acknowledgement.

BACKGROUND

In a time division duplex (Time Division Duplex; TDD) standard of a long term evolution (Long Term Evolution; LTE) system, a radio frame supports multiple different uplink and downlink subframe ratios. For each subframe ratio, the LTE TDD system also defines a delay time $k_{PHICH}$ between the time when a network-side device feeds back an acknowledgement to a user equipment (User Equipment; UE) and the time when the user equipment sends data, that is, defines a timing relation between uplink data transmission and downlink acknowledgement feedback.

The existing LTE LDD system supports a carrier aggregation (Carrier Aggregation) technology, where a user equipment can simultaneously access one or more component carriers (Component Carrier) to perform data communication with a network-side device. Generally a component carrier is also called a serving cell (Serving Cell). When a user equipment simultaneously accesses multiple serving cells, data transmission in serving cell A may be scheduled by a scheduling command sent by serving cell A, that is, self carrier scheduling is performed, or may be scheduled by a scheduling command sent by another serving cell, such as serving cell B, that is, cross-carrier scheduling is performed. When performing cross-carrier scheduling, the network-side device needs to feed back, in a serving cell sending the scheduling command, an acknowledgement for uplink data of the scheduled serving cell to the user equipment.

In the prior art, when a user equipment accesses multiple serving cells with a same subframe ratio, a network-side device occupies a control channel element (Control Channel Element; CCE) resource in an acknowledgement subframe to reserve a physical hybrid automatic repeat request indicator channel (physical HARQ indicator channel; PHICH) resource for each serving cell that is cross-carrier scheduled and sends an acknowledgement for the uplink data over the reserved PHICH resource. An evolved LTE TDD system supports simultaneous access of a user equipment to multiple serving cells with different subframe ratios, and may introduce a new subframe ratio setting for a new function, such as setting some subframes to flexible subframes. When cross-carrier scheduling is performed between serving cells with different subframe ratios, or a new subframe ratio setting is introduced for a new function, how to effectively reserve and allocate a PHICH resource has not been discussed in the prior art.

SUMMARY

Embodiments of the present invention provide a method and a device for sending and receiving an acknowledgement, so as to lower PHICH resource overhead of a system and ensure data transmission for a user equipment.

An embodiment of the present invention provides a method for sending an acknowledgement, including:

sending, by a network-side device, first subframe ratio information and second subframe ratio information to a user equipment, where subframe ratios represented by the first subframe ratio information and the second subframe ratio information are different;

determining, by the network-side device, a first acknowledgement subframe set according to a first timing relation that is set for the first subframe ratio information, and reserving a first physical hybrid automatic repeat request indicator channel PHICH resource set in an acknowledgement subframe of the first acknowledgement subframe set;

determining, by the network-side device, a second acknowledgement subframe set according to a second timing relation that is set for the second subframe ratio information, and reserving a second PHICH resource set in an acknowledgement subframe, in which the first PHICH resource set does not exist, of the second acknowledgement subframe set;

receiving, by the network-side device, uplink data sent by the user equipment according to the second subframe ratio information;

determining, by the network-side device, an acknowledgement subframe for the uplink data according to the second timing relation and a subframe for receiving the uplink data; and sending, by the network-side device by using a PHICH resource in the first PHICH resource set, an acknowledgement to the user equipment if the first PHICH resource set exists in the acknowledgement subframe, and sending, by the network-side device by using a PHICH resource in the second PHICH resource set, an acknowledgement to the user equipment if the first PHICH resource set does not exist in the acknowledgement subframe.

An embodiment of the present invention further provides a method for receiving an acknowledgement, including:

receiving, by a user equipment, first subframe ratio information and second subframe ratio information that are sent by a network-side device, where subframe ratios represented by the first subframe ratio information and the second subframe ratio information are different;

sending, by the user equipment, uplink data to the network-side device according to the second subframe ratio information;

determining, by the user equipment, an acknowledgement subframe for the uplink data according to a second timing relation that is set for the second subframe ratio information and a subframe for sending the uplink data; and if the acknowledgement subframe is a subframe in which a first physical hybrid automatic repeat request indicator channel PHICH resource set exists, receiving, by the user equipment by using a PHICH resource in the first PHICH resource set, an acknowledgement sent by the network-side device; and if the acknowledgement subframe is a subframe in which the first PHICH resource set does not exist, receiving, by the user equipment by using a PHICH resource in a reserved second PHICH resource set, an acknowledgement sent by the network-side device, where the subframe in which the first PHICH resource set exists is determined by the user equipment according to a first timing relation that is set for the first subframe ratio information.

An embodiment of the present invention further provides a network-side device, including:

a sender, configured to send first subframe ratio information and second subframe ratio information to a user equipment, where subframe ratios represented by the first subframe ratio information and the second subframe ratio information are different;

a processor, configured to determine a first acknowledgement subframe set according to a first timing relation that is set for the first subframe ratio information sent by the sender and reserve a first physical hybrid automatic repeat request indicator channel PHICH resource set in an acknowledgement subframe of the first acknowledgement subframe set; or determine a second acknowledgement subframe set according to a second timing relation that is set for the second subframe ratio information sent by the sender and reserve a second PHICH resource set in an acknowledgement subframe, in which the first PHICH resource set does not exist, of the second acknowledgement subframe set; and a receiver, configured to receive uplink data sent by the user equipment according to the second subframe ratio information sent by the sender, where:

the processor is further configured to determine, according to the second timing relation and a subframe for the uplink data received by the receiver, an acknowledgement subframe for the uplink data received by the receiver; and the sender is further configured to, if the first PHICH resource set exists in the acknowledgement subframe determined by the processor, send an acknowledgement to the user equipment by using a PHICH resource in the first PHICH resource set reserved by the processor; if the first PHICH resource set does not exist in the acknowledgement subframe determined by the processor, send an acknowledgement to the user equipment by using a PHICH resource in the second PHICH resource set reserved by the processor.

An embodiment of the present invention further provides a user equipment, including:

a receiver, configured to receive first subframe ratio information and second subframe ratio information that are sent by a network-side device, where subframe ratios represented by the first subframe ratio information and the second subframe ratio information are different;

a sender, configured to send uplink data to the network-side device according to the second subframe ratio information received by the receiver; and a processor, configured to determine an acknowledgement subframe for the uplink data according to a second timing relation that is set for the second subframe ratio information received by the receiver and a subframe for sending the uplink data; where:

the receiver is further configured to, if the acknowledgement subframe determined by the processor is a subframe in which a first physical hybrid automatic repeat request indicator channel PHICH resource set exists, receive, by using a PHICH resource in the first PHICH resource set, an acknowledgement sent by the network-side device; if the acknowledgement subframe determined by the processor is a subframe in which the first PHICH resource set does not exist, receive, by using a PHICH resource in a reserved second PHICH resource set, an acknowledgement sent by the network-side device, where the subframe in which the first PHICH resource set exists is determined by the processor according to a first timing relation that is set for the first subframe ratio.

According to the method and the device for sending and receiving an acknowledgement that are provided in the embodiments of the present invention, when a network-side device sends different subframe ratios to a user equipment, the network-side device sends, if an existing PHICH resource set exists in an acknowledgement subframe, an acknowledgement to the user equipment over the existing PHICH resource set, or sends, if no existing PHICH resource set exists in the acknowledgement subframe, the acknowledgement to the user equipment over a reserved PHICH resource set. When cross-carrier scheduling is performed between serving cells with different subframe ratios, or a new subframe ratio setting is introduced for a new function, the embodiments of the present invention can effectively lower PHICH resource overhead of a system and ensure data transmission for a user equipment.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
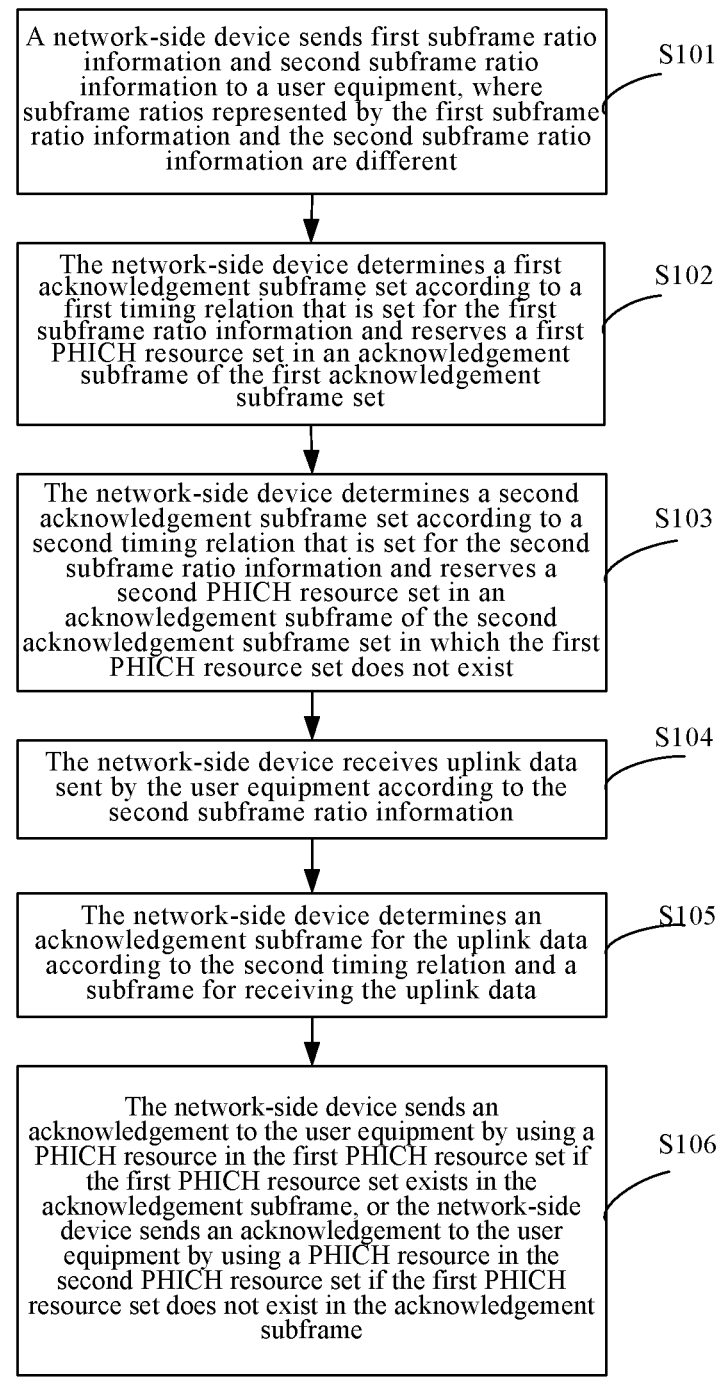
FIG. 1 is a flowchart of an embodiment of a method for sending an acknowledgement according to the present invention.

FIG. 1 is a flowchart of an embodiment of a method for sending an acknowledgement according to the present invention. As shown in FIG. 1, the method includes:

S101. A network-side device sends first subframe ratio information and second subframe ratio information to a user equipment, where subframe ratios represented by the first subframe ratio information and the second subframe ratio information are different.

S102. The network-side device determines a first acknowledgement subframe set according to a first timing relation that is set for the first subframe ratio information, and reserves a first physical hybrid automatic repeat request indicator channel PHICH resource set in an acknowledgement subframe of the first acknowledgement subframe set.

S103. The network-side device determines a second acknowledgement subframe set according to a second timing relation that is set for the second subframe ratio information, and reserves a second PHICH resource set in an acknowledgement subframe, in which the first PHICH resource set does not exist, of the second acknowledgement subframe set.

S104. The network-side device receives uplink data sent by the user equipment according to the second subframe ratio information.

S105. The network-side device determines an acknowledgement subframe for the uplink data according to the second timing relation and a subframe for receiving the uplink data.

S106. The network-side device sends an acknowledgement to the user equipment by using a PHICH resource in the first PHICH resource set if the first PHICH resource set exists in the acknowledgement subframe, or the network-side device sends an acknowledgement to the user equipment by using a PHICH resource in the second PHICH resource set if the first PHICH resource set does not exist in the acknowledgement subframe.

The foregoing steps are executed by the network-side device and may specifically be various types of base stations, relays (relay), and transceiver nodes communicating with a UE.

In S101, the subframe ratios represented by the first subframe ratio information and the second subframe ratio information that are sent by the network-side device to the user equipment are different, and the network-side device may send the first subframe ratio information and the second subframe ratio information to the user equipment in different application scenarios.

The embodiment of the present invention is applicable to a carrier aggregation scenario, and in the carrier aggregation scenario, a user equipment simultaneously accesses multiple serving cells to perform data communications with the network-side device, where each serving cell may have a different subframe ratio. As shown in the following Table 1, Table 1 lists 7 uplink and downlink subframe ratios supported by an LTE TDD system:

TABLE 1

| Subframe Ratio | Uplink-to-Downlink Switch-Point Periodicity | Subframe Index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | where D means downlink subframe, U means uplink subframe, and S means special subframe. A special subframe S may be used by a network-side device to send a downlink data packet to a user equipment, rather than being used by the user equipment to send an uplink data packet to the network-side device, and therefore is generally regarded as a downlink subframe. Table 1 provides several subframe ratios supported by the LTE TDD system. However, understandably, in addition to subframe ratio 0 to subframe ratio 6 provided by Table 1, the LTE TDD system may further support another subframe ratio, and Table 1 is not a limitation on the present invention.

In a situation where a user equipment accesses multiple serving cells, for data transmission in each serving cell, the network-side device may configure in which serving cell the user equipment receives a scheduling command. The network-side device may configure as needed in which serving cell the user equipment receives a scheduling command, or configure, according to a specific data transmission situation, in which serving cell the user equipment receives a scheduling command. For example, for uplink data transmission in serving cell A, when the network-side device sending a scheduling command in serving cell A is strongly interfered and poor reception performance of the user equipment is caused but the network-side device sending a scheduling command in serving cell B is not strongly interfered, the network-side device may send a scheduling command in serving cell B to the user equipment and configure the user equipment to receive, in serving cell B, a scheduling command sent by the network-side device for uplink data transmission in serving cell A. For uplink data transmission in a same serving cell, the serving cell configured by the network-side device for different user equipments to receive a scheduling command may be the same or different. For example, for uplink data transmission in serving cell A, the network-side device may configure user equipment 1, user equipment 2, user equipment 3, and user equipment 4 to receive a scheduling command for uplink data in serving cell A, serving cell B, serving cell C, and serving cell B, respectively.

Under the carrier aggregation scenario, the first subframe ratio information and the second subframe ratio information may correspond to different serving cells that a user equipment accesses. Specifically, the first subframe ratio information may correspond to a first serving cell that the user equipment accesses, and the second subframe ratio information may correspond to a second serving cell that the user equipment accesses.

A scheduling command for uplink data transmission in the second serving cell may be transmitted in the first serving cell, that is, for the user equipment, the first serving cell is a scheduling cell for the second serving cell. The first subframe ratio information may be carried in a system message of the first serving cell for sending, and the first subframe ratio information may be any one of subframe ratio 0 to subframe ratio 6 shown in Table 1.

As a feasible implementation manner, the second subframe ratio information may be carried in a system message of the second serving cell for sending, and the second subframe ratio information may be any one of subframe ratio 0 to subframe ratio 6 shown in Table 1 except the first subframe ratio information. In carrier aggregation, when a user equipment accesses multiple serving cells, one serving cell among the multiple serving cells is configured as a primary serving cell (Primary Cell) for the user equipment and other serving cells are secondary serving cells (Secondary Cell). For each user equipment, the network-side device may send, in the primary serving cell, system messages of all serving cells; specifically, the network-side device may send a system message of the primary serving cell through broadcast information sent in the primary serving cell, and send system messages of the secondary serving cells through dedicated radio resource control (Radio Resource Control, RRC) signaling sent in the primary serving cell. For example, when the first serving cell is the primary serving cell of a user equipment, the first subframe ratio information is sent in the first serving cell by the network-side device through broadcast information and the second subframe ratio information is sent in the first serving cell by the network-side device through dedicated RRC signaling.

As another feasible implementation manner, the second subframe ratio information may further be subframe ratio information newly defined in an evolution release of an LTE TDD system. In addition, the network-side device may further set some subframes of a serving cell that a user equipment accesses as flexible subframes, and these flexible subframes may be used flexibly and in real time by the network-side device according to a service traffic requirement of the user equipment to transmit uplink data or downlink data. Therefore, the second subframe ratio information may include flexible subframe information that the network-side device configures for the user equipment. Typical flexible subframe information that the network-side device configures for the user equipment may be: {D, S, U, F, F, D, S, U, F, F}, where F means flexible subframe. A flexible subframe F may be used by the network-side device to send a downlink data packet to the user equipment, or by the user equipment to send an uplink data packet to the network-side device. Understandably, the flexible subframe information may further be another form supported by the LTE TDD system and is not enumerated here. The second subframe ratio information may be sent by the network-side device over dedicated RRC signaling, medium access control (Medium Access Control, MAC) signaling, or the like.

After receiving the first subframe ratio information and the second subframe ratio information that are sent by the network-side device, the user equipment may determine, according to the first subframe ratio information, a subframe that can be used to send uplink data in the first serving cell, and determine, according to the second subframe ratio information, a subframe that can be used to send uplink data in the second serving cell. When the second subframe ratio information includes flexible subframe information, the subframe that is determined by the user equipment and can be used to send uplink data in the second serving cell may be a fixed uplink subframe or a flexible subframe; further, among subframes that are determined and can be used to send the uplink data in the second serving cell, the user equipment may send the uplink data to the network-side device over a scheduled subframe.

After receiving, in the second serving cell, the uplink data sent by the user equipment, the network-side device sends, in the first serving cell, an acknowledgement for the uplink data to the user equipment. In this embodiment, the first serving cell and the second serving cell have different subframe ratios, and a scheduling command for uplink data transmission in the second serving cell is transmitted in the first serving cell, that is, the first serving cell may perform cross-carrier scheduling to the uplink data transmission in the second serving cell with a different subframe ratio. When uplink data transmission in multiple serving cells that a user equipment accesses is cross-carrier scheduled by a serving cell with a different subframe ratio, for uplink data transmission in each serving cell, the network-side device may adopt the method for sending an acknowledgement according to the embodiment of the present invention to feed back an acknowledgement for the uplink data to the user equipment.

For uplink data sent in the first serving cell by the user equipment according to the first subframe ratio information, when the network-side device feeds back an acknowledgement in the first serving cell, the network-side device may determine, according to the first timing relation that is set for the first subframe ratio and a subframe for receiving the uplink data, a subframe for sending the acknowledgement, where the subframe for sending the acknowledgement is a subframe in which the first PHICH resource set exists according to the embodiment of the present invention. The first timing relation may be represented in a form of a table, and the table may be prestored in a network device side and a user equipment side. The first timing relation identifies a delay time between the time when the network-side device feeds back an acknowledgement and the time when the user equipment sends the uplink data. The delay time may be represented by the number of subframes. The following gives a first timing relation, as shown in Table 2:

TABLE 2

| Subframe Ratio | Subframe Index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

As can be seen from Table 2, each downlink subframe can feed back an acknowledgement corresponding to uplink data of $m_i$ subframes, as shown in the following Table 3:

TABLE 3

| Subframe Ratio | Subframe Index n | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

In Table 3, a subframe with $m_i=0$ means that according to the first timing relation shown in Table 2, the network-side device does not need to send an acknowledgement over this subframe and the first PHICH resource set does not exist in this subframe; a subframe with $m_i>=1$ means that according to the first timing relation shown in Table 2, the network-side device needs to send an acknowledgement over this subframe and a first PHICH resource set exists in this subframe. As can be seen, for the first timing relation shown in Table 2, a subframe with $m_i>=1$ in Table 3 is a subframe in which the first PHICH resource set exists and that is acquired according to the first timing relation that is set for the first subframe ratio.

Table 2 gives only a delay time, supported by the LTE TDD system, between the time when the network-side device feeds back an acknowledgement and the time when the user equipment sends uplink data. Understandably, the LTE TDD system may further support another delay time between the time when the network-side device feeds back an acknowledgement and the time when the user equipment sends uplink data, that is, the first timing relation may be another form in addition to Table 2, and Table 2 is not a limitation on the present invention.

For the uplink data sent in the second serving cell by the user equipment according to the second subframe ratio information, the network-side device may determine, according to the second timing relation that is set for the second subframe ratio information and a subframe for receiving the uplink data, an acknowledgement subframe for sending an acknowledgement in the first serving cell. The second timing relation may be represented in a form of a table, and the table may be prestored in a network-side device side and a user equipment side. It should be noted that the first timing relation and the second timing relation that are involved in the present invention may be the same; for example, both may be represented by the timing relation shown in Table 2. Alternatively, the first timing relation and the second timing relation may also be different.

For the uplink data sent in the second serving cell by the user equipment according to the second subframe ratio information, the network-side device can first determine, according to the second timing relation that is set for the second subframe ratio and a subframe for receiving the uplink data by the network-side device, an acknowledgement subframe for sending an acknowledgement, where the acknowledgement subframe determined herein may be a subframe in which the first PHICH resource set exists, or may be a frame in which the first PHICH resource set does not exist. When the determined acknowledgement subframe is a subframe in which the first PHICH resource set exists, the network-side device may send, by using a PHICH resource in the reserved first PHICH resource set in the subframe of the first serving cell, an acknowledgement corresponding to the uplink data transmission in the second serving cell to the user equipment. When the determined acknowledgement subframe is a subframe in which the first PHICH resource set does not exist, the network-side device may send, by using a PHICH resource in the reserved second PHICH resource set in the subframe of the first serving cell, an acknowledgement corresponding to the uplink data transmission of the second serving cell to the user equipment.

Because the network-side device may simultaneously communicate with multiple user equipments, an operation of the network-side device to reserve a PHICH resource generally does not aim at a certain uplink data transmission of a certain terminal. Therefore, the network-side device may perform in advance an operation of reserving the first PHICH resource set and the second PHICH resource set.

Specifically, the network-side device may determine a first acknowledgement subframe set according to the first timing relation determined for the first subframe ratio information and reserve the first PHICH resource set in an acknowledgement subframe of the first acknowledgement subframe set. The first acknowledgement subframe set includes all possible acknowledgement subframes corresponding to the uplink data sent by the user equipment according to the first subframe ratio information, and the first PHICH resource set exists in all the acknowledgement subframes of the first acknowledgement subframe set. Therefore, for an acknowledgement subframe in the first acknowledgement subframe set, the network-side device does not need to perform an operation of reserving the second PHICH resource set.

Likewise, the network-side device may further determine a second acknowledgement subframe set according to the second timing relation determined for the second subframe ratio information and reserve the second PHICH resource set in an acknowledgement subframe of the second acknowledgement subframe set. The second acknowledgement subframe set includes all possible acknowledgement subframes corresponding to the uplink data sent by the user equipment according to the second subframe ratio information. Because the first PHICH resource set may exist in some of the acknowledgement subframes of the second acknowledgement subframe set and may not exist in some acknowledgement subframes, the network-side device may reserve the second PHICH resource set in a subframe, in which the first PHICH resource set does not exist, of the second acknowledgement subframe set.

Because the first PHICH resource set may exist in some of the acknowledgement subframes of the second acknowledgement subframe set and may not exist in some acknowledgement subframes, it can be seen that the second acknowledgement subframe set and the first acknowledgement subframe set may have an intersection, that is, the second acknowledgement subframe set and the first acknowledgement subframe set may have a same acknowledgement subframe.

In addition, in S105, the network-side device determines the acknowledgement subframe for the uplink data according to the second timing relation and the subframe for receiving the uplink data. Therefore, it can be seen that in this operation, the acknowledgement subframe determined by the network-side device exists in the second acknowledgement subframe set.

It should be noted that the operation of the network-side device to determine the first acknowledgement subframe set and reserve the first PHICH resource set in the acknowledgement subframe of the first acknowledgement subframe set, the operation of the network-side device to determine the second acknowledgement subframe set and reserve the second PHICH resource set in the acknowledgement subframe of the second acknowledgement subframe set, and the operation of the network-side device to send the first subframe ratio information and the second subframe ratio information to the user equipment are not sequentially limited. That is, S101, S102, and S103 are executed in no particular order. In addition, S102 and S102 are also executed in no particular order.

For an acknowledgement subframe, in which the first PHICH resource set does not exist, of the second acknowledgement subframe set, the network-side device may reserve the second PHICH resource set in a control channel element CCE resource and/or a physical downlink shared channel resource of the acknowledgement subframe. Alternatively, the network-side device may further reserve the second PHICH resource set in a resource of a resource element group (Resource Element Group, REG) except a PCFICH, a PHICH, and a PDCCH in an orthogonal frequency division multiplexing (Orthogonal Frequency Division Multiplexing; OFDM) symbol indicated by a physical control format indicator channel (Physical Control Format Indicator Channel; PCFICH) of the acknowledgement subframe.

The foregoing describes a situation where the first subframe ratio information and the second subframe ratio information correspond to different serving cells that a user equipment accesses. As another feasible implementation manner, the first subframe ratio information and the second subframe ratio information that are involved in the embodiment of the present invention may correspond to a same serving cell that a user equipment accesses. It should be noted that in this situation, the number of serving cells that the user equipment accesses may be greater than one or equal to one.

The LTE TDD system is an evolving wireless communications system. Standardization of Release 8 (Release8), Release 9 (Release9), and Release 10 (Release10) of the 3GPP LTE TDD system has been discussed and completed, where a user equipment acquires subframe ratio information by receiving a system message broadcast by a network-side device. Currently, initiating standardization of Release 11 and Release 12 is being discussed. Some more advanced functions, such as flexible subframe configuration, may be introduced in these evolution releases but full compatibility with completed releases needs to be maintained. For example, a user equipment of Release 8 can access a network-side device of Release 11 and communicate normally with the network-side device; a user equipment of Release 11 can also access a network-side device of Release 8 and communicate normally with the network-side device. In an evolution release such as Release 11, for a same serving cell, the network-side device may notify a same user equipment of two pieces of subframe ratio information, namely, the first subframe ratio information and the second subframe ratio information, where the first subframe ratio information may be delivered by the system for backward compatibility with a user equipment of an earlier release and the second subframe ratio information may be delivered for a user equipment of an evolution release to use a more advanced function. The first subframe ratio information may be delivered by the network-side device through the broadcast system message.

Neither of the first subframe ratio information and the second subframe ratio information may include flexible subframe information. Specifically, the first subframe ratio information may be any one of the subframe ratios shown in Table 1; the second subframe ratio information may be any one of the subframe ratios shown in Table 1 except the first subframe ratio information; or the second subframe ratio information may further be another subframe ratio information newly defined in an evolution release. As another feasible implementation manner, the network-side device may further set some subframes of a serving cell that a user equipment accesses as flexible subframes, and these flexible subframes may be used flexibly and in real time by the network-side device according to a service traffic requirement of the user equipment to transmit uplink data or downlink data. Therefore, the first subframe ratio information may not include flexible subframe information, and the second subframe ratio information may include flexible subframe information that the network-side device configures for the user equipment. Typical flexible subframe information that the network-side device configures for the user equipment is: {D, S, U, F, F, D, S, U, F, F}, where F means flexible subframe. A flexible subframe F may be used by the network-side device to send a downlink data packet to the user equipment, or by the user equipment to send an uplink data packet to the network-side device.

The second subframe ratio information may be sent by the network-side device to the user equipment through the broadcast system message, or in any other manner, for example, sent by the network-side device to the user equipment through dedicated RRC signaling, MAC signaling, physical layer signaling, or the like.

The network-side device may determine, according to the first timing relation that is set for the first subframe ratio and a subframe for receiving uplink data, a subframe for sending an acknowledgement. The determined subframe is a subframe in which the first PHICH resource set exists according to the embodiment of the present invention. As described in the foregoing, when the first subframe ratio and the second subframe ratio correspond to a same serving cell that a user equipment accesses, the serving cell may further simultaneously serve a user equipment of an earlier release, for example, a user equipment of LTE TDD Release 8. A most important purpose for the network-side device to send the first subframe ratio information to the user equipment, set the first timing relation, and reserve the first PHICH resource set is to allow a user equipment of an earlier release to access the serving cell to perform normal communications. However, after acquiring the first subframe ratio information, a user equipment of an evolution release may also receive an acknowledgement over a subframe in which the first PHICH resource set exists.

For the uplink data sent by the user equipment, the network-side device may determine, according to the second timing relation that is set for the second subframe ratio and a subframe for receiving the uplink data, an acknowledgement subframe for sending an acknowledgement. The acknowledgement subframe determined herein may be a subframe in which the first PHICH resource set exists, or may be a subframe in which the first PHICH resource set does not exist. For example, in a situation where the second subframe ratio information is flexible subframe information, for uplink data sent by the user equipment over an uplink subframe U and/or a flexible subframe F, the network-side device determines, according to the second timing relation that is set for the second subframe ratio, an acknowledgement subframe for sending an acknowledgement. The acknowledgement subframe may be a subframe in which the first PHICH resource set exists, or may be a subframe in which the first PHICH resource set does not exist. If the first PHICH resource set exists in the acknowledgement subframe determined by the network-side device according to the second timing relation that is set for the second subframe ratio, the network-side device may send a corresponding acknowledgement by using a PHICH resource in the reserved first PHICH resource set in the subframe. If the first PHICH resource set does not exist in the acknowledgement subframe determined by the network-side device according to the second timing relation that is set for the second subframe ratio, the network-side device may send a corresponding acknowledgement over a PHICH resource in the reserved second PHICH resource set in the subframe.

The first timing relation and the second timing relation may be represented in a form of a table, and the table may be prestored in a network-side device side and a user equipment side. The first timing relation and the second timing relation may be the same, for example, as represented by the form shown in Table 2; the first timing relation and the second timing relation may also be different.

For a specific manner for reserving the first PHICH resource set and the second PHICH resource set, reference may be made to the related description about the method for reserving a PHICH resource during cross-carrier scheduling provided in this embodiment, and no further details are provided herein.

According to the method for sending an acknowledgement provided in the embodiment of the present invention, when a user equipment receives different subframe ratios sent by a network-side device, the network-side device sends, if an existing PHICH resource set exists in an acknowledgement subframe, an acknowledgement to the user equipment over the existing PHICH resource set, or sends, if no existing PHICH resource set exists in the acknowledgement subframe, an acknowledgement to the user equipment over a reserved PHICH resource set. When cross-carrier scheduling is performed between serving cells with different subframe ratios, or a new subframe ratio setting is introduced for a new function, this embodiment can effectively lower PHICH resource overhead of a system and ensure data transmission for a user equipment.

Figure 2:
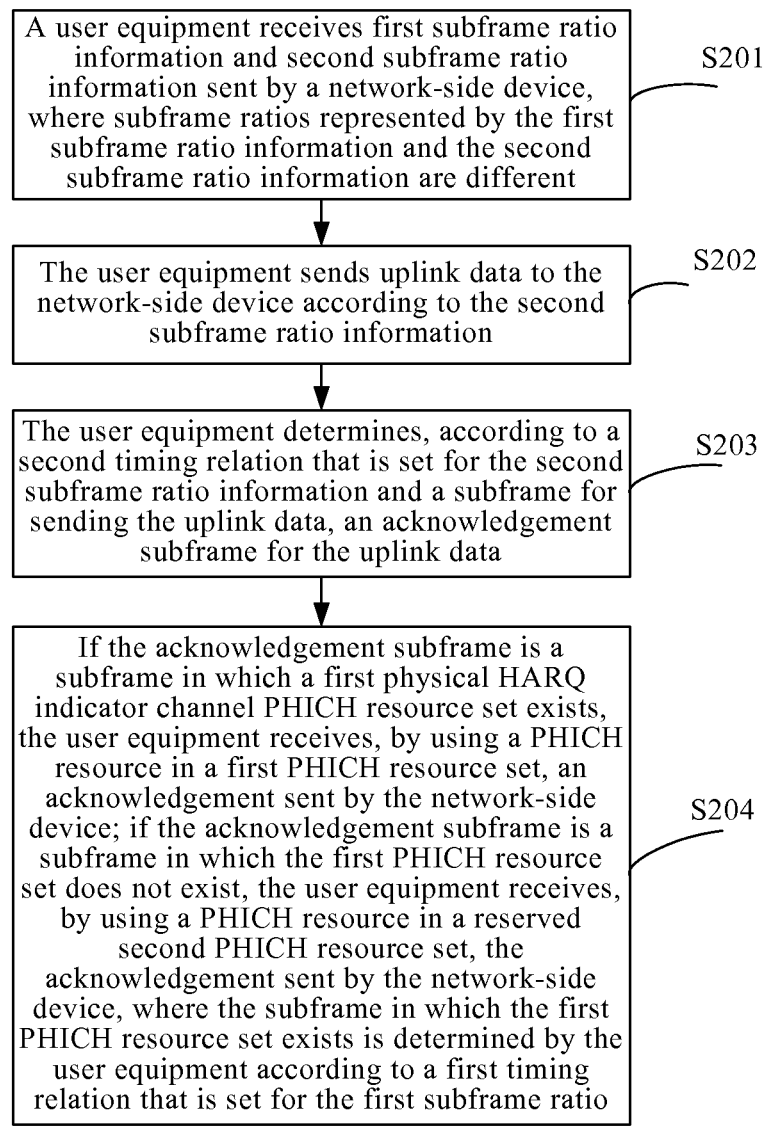
FIG. 2 is a flowchart of an embodiment of a method for receiving an acknowledgement according to the present invention.
Figure 3:
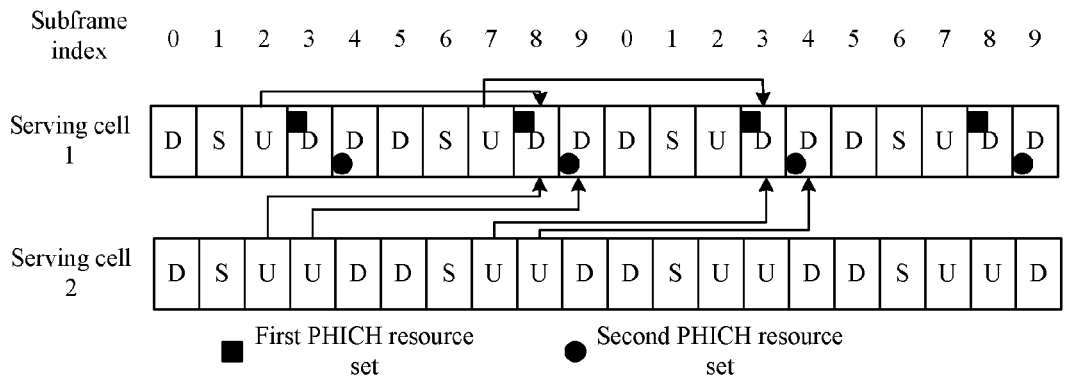
FIG. 3 is a schematic diagram of an acknowledgement subframe in an embodiment of cross-carrier scheduling according to the present invention.

FIG. 2 is a flowchart of an embodiment of a method for receiving an acknowledgement according to the present invention. As shown in FIG. 2, the method includes:

S201. A user equipment receives first subframe ratio information and second subframe ratio information that are sent by a network-side device, where subframe ratios represented by the first subframe ratio information and the second subframe ratio information are different.

S202. The user equipment sends uplink data to the network-side device according to the second subframe ratio information.

S203. The user equipment determines an acknowledgement subframe for the uplink data according to a second timing relation that is set for the second subframe ratio information and a subframe for sending the uplink data.

S204. If the acknowledgement subframe is a subframe in which a first physical hybrid automatic repeat request indicator channel PHICH resource set exists, the user equipment receives, by using a PHICH resource in the first PHICH resource set, an acknowledgement sent by the network-side device; if the acknowledgement subframe is a subframe in which the first PHICH resource set does not exist, the user equipment receives, by using a PHICH resource in a reserved second PHICH resource set, an acknowledgement sent by the network-side device, where the subframe in which the first PHICH resource set exists is determined by the user equipment according to a first timing relation that is set for the first subframe ratio.

The foregoing steps are executed by the user equipment UE.

In S201, the subframe ratios represented by the first subframe ratio information and the second subframe ratio information that are received by the user equipment and sent by the network-side device are different. The user equipment may receive, in various application scenarios, the first subframe ratio information and the second subframe ratio information that are sent by the network-side device.

The embodiment of the present invention is applicable to a carrier aggregation scenario; in the carrier aggregation scenario, a user equipment simultaneously accesses one or more component carriers to perform data communications with the network-side device, where each component carrier is called a serving cell. If the user equipment accesses multiple serving cells, the multiple serving cells being accessed may have different subframe ratios.

In a situation where a user equipment accesses multiple serving cells, for data transmission in each serving cell, the network-side device may configure in which serving cell the user equipment receives a scheduling command. The network-side device may configure as needed in which cell the user equipment receives a scheduling command, or configure, according to a specific data transmission situation, in which cell the user equipment receives a scheduling command.

In the carrier aggregation scenario, the first subframe ratio information and the second subframe ratio information may correspond to different serving cells that a user equipment accesses. Specifically, the first subframe ratio information may correspond to a first serving cell that the user equipment accesses, and the second subframe ratio information may correspond to a second serving cell that the user equipment accesses.

A scheduling command for uplink data transmission in the second serving cell may be transmitted in the first serving cell, that is, for the user equipment, the first serving cell is a scheduling cell for the second serving cell. The first subframe ratio information may be carried in a system message of the first serving cell for sending, and the first subframe ratio information may be any one of subframe ratio 0 to subframe ratio 6 shown in Table 1.

As a feasible implementation manner, the network-side device may carry the second subframe ratio information in a system message of the second serving cell for sending, and the second subframe ratio information may be any one of subframe ratio 0 to subframe ratio 6 shown in Table 1 except the first subframe ratio information.

For each user equipment, the network-side device may send, in the primary serving cell, system messages of all serving cells; specifically, the network-side device may send a system message of the primary serving cell by sending broadcast information in the primary serving cell, and send system messages of the secondary serving cells by sending dedicated RRC signaling in the primary serving cell. For example, when the first serving cell is the primary serving cell of a user equipment, the first subframe ratio information is sent in the first serving cell by the network-side device through broadcast information and the second subframe ratio information is sent in the first serving cell by the network-side device through dedicated RRC signaling.

As another feasible implementation manner, the second subframe ratio information may further be subframe ratio information newly defined in an evolution release of an LTE TDD system. In addition, the network-side device may further set some subframes of a serving cell that a user equipment accesses as flexible subframes, and these flexible subframes may be used flexibly and in real time by the network-side device according to a service traffic requirement of the user equipment, to transmit uplink data or downlink data. Therefore, the second subframe ratio information may be flexible subframe information that the network-side device configures for the user equipment. Understandably, the flexible subframe information may further be another form supported by the LTE TDD system and is not enumerated here. The second subframe ratio information may be sent by the network-side device over dedicated RRC signaling, MAC signaling, or the like.

After receiving the first subframe ratio information and the second subframe ratio information that are sent by the network-side device, the user equipment may determine, according to the first subframe ratio information, a subframe that can be used to send uplink data in the first serving cell, and determine, according to the second subframe ratio information, a subframe that can be used to send uplink data in the second serving cell. When the second subframe ratio information includes flexible subframe information, the subframe that is determined by the user equipment and can be used to send uplink data in the second serving cell may be a fixed uplink subframe or a flexible subframe; further, among subframes that are determined and can be used to send the uplink data in the second serving cell, the user equipment may send the uplink data to the network-side device over a scheduled subframe.

For the uplink data sent in the second serving cell by the user equipment to the network-side device, the user equipment receives, in the first serving cell, an acknowledgement for the uplink data, where the acknowledgement is sent by the network-side device. In this embodiment, the first serving cell and the second serving cell have different subframe ratios, and the user equipment receives, in the first serving cell, a scheduling command for the uplink data transmission in the second serving cell, where the scheduling command is sent by the network-side device, that is, the first serving cell may schedule across carriers the uplink data transmission in the second serving cell with a different subframe ratio.

For the uplink data sent in the first serving cell by the user equipment according to the first subframe ratio information, when the network-side device feeds back, in the first serving cell, an acknowledgement for the uplink data, the user equipment may determine, according to the first timing relation that is set for the first subframe ratio and a subframe for sending the uplink data in the first serving cell, a subframe for receiving the acknowledgement for the uplink data. The determined subframe is a subframe in which the first PHICH resource set exists according to the embodiment of the present invention. The first timing relation may be represented in a form of a table, and the table may be prestored in the network-side device and the user equipment. The first timing relation may be shown in Table 2. In Table 2, each downlink subframe can feed back an acknowledgement corresponding to uplink data of $m_i$ subframes. As shown in Table 3, when $m_i=0$, the user equipment does not need to receive the acknowledgement over the subframe and the first PHICH resource set does not exist in the subframe; a subframe with $m_i>=1$ means that according to the first timing relation shown in Table 2, the user equipment needs to receive an acknowledgement over the subframe and the first PHICH resource set exists in the subframe. As can be seen, for the first timing relation shown in Table 2, a subframe with $m_i>=1$ in Table 3 is a subframe in which the first PHICH resource set exists and that is acquired according to the first timing relation that is set for the first subframe ratio.

For the uplink data sent in the second serving cell by the user equipment according to the second subframe ratio information, the user equipment may determine, according to the second timing relation that is set for the second subframe ratio and a subframe for sending the uplink data in the second serving cell, an acknowledgement subframe for sending an acknowledgement in the first serving cell. The second timing relation may be represented in a form of a table, and the table may be prestored in the network-side device and the user equipment. It should be noted that the first timing relation and the second timing relation that are involved in the present invention may be the same; for example, both may be represented by the timing relation shown in Table 2. Alternatively, the first timing relation and the second timing relation may also be different.

For the uplink data sent in the second serving cell by the user equipment according to the second subframe ratio information, the user equipment can determine, according to the second timing relation that is set for the second subframe ratio and a subframe for sending the uplink data, an acknowledgement subframe for receiving an acknowledgement, where the acknowledgement subframe determined herein may be a subframe in which the first PHICH resource set exists, or may be a subframe in which the first PHICH resource set does not exist. When the determined acknowledgement subframe is a subframe in which the first PHICH resource set exists, the user equipment may receive, by using a PHICH resource in the reserved first PHICH resource set in the subframe of the first serving cell, an acknowledgement that is sent by the network-side device and corresponds to the uplink data transmission in the second serving cell. When the determined acknowledgement subframe is a subframe in which the first PHICH resource set does not exist, the user equipment may receive, by using a PHICH resource in the reserved second PHICH resource set in the subframe of the first serving cell, an acknowledgement that is sent by the network-side device and corresponds to the uplink data of the second serving cell.

For the operation of the network-side device to reserve the first PHICH resource set and reserve the second PHICH resource set, reference may be made to the related description in the embodiment of the method for sending an acknowledgement, and no further details are provided herein.

The foregoing describes a situation where the first subframe ratio information and the second subframe ratio information correspond to different serving cells that a user equipment accesses. As another feasible implementation manner, the first subframe ratio information and the second subframe ratio information that are involved in the embodiment of the present invention may correspond to a same serving cell that a user equipment accesses. It should be noted that in this situation, the number of serving cells that the user equipment accesses may be greater than one or equal to one.

Neither of the first subframe ratio information and the second subframe ratio information may include flexible subframe information. Specifically, the first subframe ratio information may be any one of the subframe ratios shown in Table 1; the second subframe may be any one of the subframe ratios shown in Table 1 except the first subframe ratio information; or the second subframe ratio information may further be another subframe ratio information newly defined in an evolution release. As another feasible implementation manner, the network-side device may further set some subframes of a serving cell that a user equipment accesses as flexible subframes, and these flexible subframes may be used flexibly and in real time by the network-side device according to a service traffic requirement of the user equipment to transmit uplink data or downlink data. Therefore, the first subframe ratio information may not include flexible subframe information, and the second subframe ratio information may include flexible subframe information that the network-side device configures for the user equipment.

The second subframe ratio information may be sent by the network-side device to the user equipment through the broadcast system message, or in any other manner, for example, sent by the network-side device to the user equipment through dedicated RRC signaling, MAC signaling, physical layer signaling, or the like.

The user equipment may determine, according to the first timing relation that is set for the first subframe ratio and a subframe for sending uplink data, a subframe for receiving an acknowledgement. These determined subframes are subframes in which the first PHICH resource set exists involved in the embodiment of the present invention. As described in the foregoing, when the first subframe ratio and the second subframe ratio correspond to a same serving cell that a user equipment accesses, the serving cell may further simultaneously serve a user equipment of an earlier release, for example, a user equipment of LTE TDD Release 8. A most important purpose for the network-side device to send the first subframe ratio information to the user equipment, set the first timing relation, and reserve the first PHICH resource set is to allow a user equipment of an earlier release to access the serving cell to perform normal communications. However, after acquiring the first subframe ratio information, a user equipment of an evolution release may also receive an acknowledgement over a subframe in which the first PHICH resource set exists.

The user equipment may determine, according to the second timing relation that is set for the second subframe ratio and a corresponding subframe for sending uplink data, an acknowledgement subframe for receiving an acknowledgement sent by the network-side device. The acknowledgement subframe determined herein may be a subframe in which the first PHICH resource set exists, or may be a subframe in which the first PHICH resource set does not exist. For example, in a situation where the second subframe ratio information is flexible subframe information, for uplink data sent by the user equipment over an uplink subframe U and/or a flexible subframe F, the user equipment may determine, according to the second timing relation that is set for the second subframe ratio, an acknowledgement subframe for receiving an acknowledgement. The acknowledgement subframe may be a subframe in which the first PHICH resource set exists, or may be a subframe in which the first PHICH resource set does not exist. If the first PHICH resource set exists in the acknowledgement subframe determined by the network-side device according to the second timing relation that is set for the second subframe ratio, the user equipment may receive a corresponding acknowledgement by using a PHICH resource in the reserved first PHICH resource set in the subframe. If the first PHICH resource set does not exist in the acknowledgement subframe determined by the user equipment according to the second timing relation that is set for the second subframe ratio, the user equipment may receive a corresponding acknowledgement by using a PHICH resource in the reserved second PHICH resource set in the subframe.

The first timing relation and the second timing relation may be represented in a form of a table, and the table may be prestored in a network-side device side and a user equipment side. The first timing relation and the second timing relation may be the same, for example, as represented by the form shown in Table 2; the first timing relation and the second timing relation may also be different.

According to the method for receiving an acknowledgement provided in the embodiment of the present invention, when a user equipment receives different subframe ratios sent by a network-side device, the network-side device sends, if an existing PHICH resource set exists in an acknowledgement subframe, an acknowledgement to the user equipment over the existing PHICH resource set, or sends, if no existing PHICH resource set exists in the acknowledgement subframe, an acknowledgement to the user equipment over a reserved PHICH resource set. When cross-carrier scheduling is performed between serving cells with different subframe ratios, or a new subframe ratio is introduced for a new function, this embodiment can effectively lower PHICH resource overhead of a system and ensure data transmission for a user equipment.

The following describes the present invention in detail by using a specific example of a cross-carrier scheduling scenario, that is, first subframe ratio information and second subframe ratio information correspond to different cells that a user equipment accesses: It is assumed that the user equipment simultaneously accesses serving cell 1 and serving cell 2, a network-side device configures the user equipment to receive, in serving cell 1, a scheduling command for uplink data transmission in serving cell 2.

In this embodiment, serving cell 1 uses uplink/downlink subframe ratio 2 shown in Table 1 and serving cell 2 uses uplink/downlink subframe ratio 1 shown in Table 1; the network-side device sends, through serving cell 1, the scheduling command for the uplink data transmission in serving cell 2 to schedule the uplink data transmission in serving cell 2. The network-side device feeds back, in serving cell 1, an acknowledgement corresponding to uplink data of serving cell 1, and the network-side device further feeds back, in serving cell 1, an acknowledgement corresponding to uplink data of serving cell 2. If a first timing relation is as shown in Table 2, the user equipment may send uplink data over subframe 2 and subframe 7 of serving cell 1; correspondingly, the network-side device may send an acknowledgement for the uplink data over subframe 3 and subframe 8; as can be seen from Table 3, a first PHICH resource set exists in subframe 3 and subframe 8. Therefore, the network-side device may send the acknowledgement to the user equipment over a PHICH resource in the first PHICH resource set in subframe 3 and subframe 8.

A subframe ratio corresponding to serving cell 2 is different from a subframe ratio corresponding to serving cell 1; therefore, according to the second timing relation shown in Table 3, for uplink data sent by the user equipment over subframe 2 and subframe 7 of serving cell 2, the network-side device may correspondingly send an acknowledgement for the uplink data to the user equipment over a PHICH resource in the first PHICH resource set in subframe 8 and subframe 3 of serving cell 1; for uplink data sent by the user equipment over subframe 3 and subframe 8 of serving cell 2, the network-side device may correspondingly send an acknowledgement to the user equipment over subframe 9 and subframe 4 of serving cell 1. Because the first PHICH resource set does not exist in subframe 9 and subframe 4, the network-side device may reserve a second PHICH resource set in subframe 9 and subframe 4, so that the network-side device may feed back the acknowledgement to the user equipment over a PHICH resource in the reserved second PHICH resource set in subframe 9 and subframe 4.

Because the network-side device may simultaneously communicate with multiple user equipments, an operation of the network-side device to reserve a PHICH resource generally does not aim at a certain uplink data transmission of a certain terminal. Therefore, the network-side device may perform in advance an operation of reserving the first PHICH resource set and the second PHICH resource set.

Specifically, the network-side device may determine a first acknowledgement subframe set according to the first timing relation determined for the first subframe ratio information and reserve the first PHICH resource set in an acknowledgement subframe of the first acknowledgement subframe set. The first acknowledgement subframe set includes all possible acknowledgement subframes corresponding to the uplink data sent by the user equipment according to the first subframe ratio information, and the first PHICH resource set exists in all the acknowledgement subframes of the first acknowledgement subframe set. Therefore, for an acknowledgement subframe in the first acknowledgement subframe set, the network-side device does not need to perform an operation of reserving the second PHICH resource set.

An embodiment of the present invention further provides a method for reserving a resource in a first PHICH resource set. Specifically, in each downlink subframe and special subframe, the number of reserved PHICH resource groups is $m_i \cdot N_{PHICH}^{group}$, where a value of $m_i$ is given by Table 3, $N_{PHICH}^{group} = \lceil N_g (N_{RB}^{DL}/8) \rceil$ for a subframe structure with a short cyclic prefix, $N_{PHICH}^{group} = 2 \cdot \lceil N_g (N_{RB}^{DL}/8) \rceil$ for a subframe structure with an extended cyclic prefix, $\lceil\ \rceil$ means a round-up operation, $N_g \in \{1/6, 1/2, 1, 2\}$ is a parameter notified by broadcast, and $N_{RB}^{DL}$ is a downlink system bandwidth of a serving cell in which the first PHICH resource set is located. Each PHICH resource in the first PHICH resource set is identified by an index pair $(n_{PHICH}^{group}, n_{PHICH}^{seq})$, where $n_{PHICH}^{group}$ means a group number of a PHICH resource group in which a PHICH resource is located and $n_{PHICH}^{seq}$ means an orthogonal sequence index in the PHICH resource group. For uplink data sent by a user equipment, when a network-side device feeds back a downlink acknowledgement to the user equipment by using a PHICH resource in the first PHICH resource set, a method for allocating the PHICH resource may be $n_{PHICH}^{group} = (I_{PRB\_RA} + n_{DMRS}) \mod N_{PHICH}^{group} + I_{PHICH} N_{PHICH}^{group}$, $n_{PHICH}^{seq} = (\lfloor I_{PRB\_RA}/N_{PHICH}^{group} \rfloor + n_{DMRS}) \mod 2 N_{SF}^{PHICH}$, where $I_{PRB\_RA}$ means an index of a physical resource block occupied by the uplink data, $n_{DMRS}$ is acquired by cyclic shift of a demodulation pilot, $N_{SF}^{PHICH} = 4$ for a subframe structure with a short cyclic prefix, $N_{SF}^{PHICH} = 2$ for a subframe structure with an extended cyclic prefix, the value of $I_{PHICH}$ is 1 when an uplink/downlink subframe ratio is 0 and the uplink data is in subframe 4 or subframe 9, and is 0 otherwise, and $\lfloor\ \rfloor$ means a round-down operation. Reserving a resource in the first PHICH resource set is the prior art. For details about a method for reserving the resource, reference may be made to various methods provided by the prior art, which will not be further described in this embodiment.

Likewise, the network-side device may further determine a second acknowledgement subframe set according to a second timing relation determined for the second subframe ratio information and reserve a second PHICH resource set in an acknowledgement subframe of the second acknowledgement subframe set. The second acknowledgement subframe set includes all possible acknowledgement subframes corresponding to the uplink data sent by the user equipment according to the second subframe ratio information. Because the first PHICH resource set may exist in some of the acknowledgement subframes of the second acknowledgement subframe set and may not exist in some acknowledgement subframes, the network-side device may reserve the second PHICH resource set in a subframe, in which the first PHICH resource set does not exist, of the second acknowledgement subframe set.

An embodiment of the present invention further provides a method for reserving a resource in a second PHICH resource set. Specifically, in LTE TDD, a downlink physical control channel includes a PCFICH, a PDCCH, and a PHICH, where the PCFICH channel is used to indicate the number of OFDM symbols occupied by the PDCCH channel, and the PDCCH channel is used by a network-side device to send a scheduling command to a user equipment for uplink/downlink data transmission. A basic time frequency resource unit occupied by a PCFICH and PHICH channel is an REG resource, where one REG is formed by 6 or 4 consecutive time frequency resource elements in an OFDM symbol. A basic time frequency resource unit occupied by the PDCCH channel is a CCE, where one CCE is formed by 9 REGs. The PCFICH channel occupies 4 REGs in a first OFDM symbol of a subframe. 8 PHICH resources may be multiplexed on 3 REGs. In an OFDM symbol occupied by a control channel indicated by the PCFICH, all CCEs of the PDCCH channel are interleaved and discretely mapped to the full band in the unit of REG. A downlink physical shared channel is further included in addition to the downlink physical control channel and used by a network device to send downlink data to the user equipment.

As a feasible implementation manner, for an acknowledgement subframe, in which a first PHICH resource set does not exist, of a second acknowledgement subframe set, the network-side device may reserve the second PHICH resource set by occupying some CCE resources and/or a physical downlink shared channel resource. The physical downlink shared channel resource means a remaining OFDM symbol resource except an OFDM symbol for transmitting the PDCCH. Using an example of a subframe structure with a short cyclic prefix, a subframe is formed by 14 OFDM symbols; when a value indicated by the PCFICH is 2, it means that first 2 OFDM symbols of a subframe may transmit the PDCCH and the remaining 12 OFDM symbols of the subframe may be used to transmit the physical downlink shared channel. In addition, in an OFDM symbol indicated by the PCFICH, some REG resources may still remain except for the PCFICH, the PHICH, and the PDCCH, and these remaining REG resources may also be used to reserve the second PHICH resource set.

One CCE is formed by 9 REGs and 8 PHICH resources may be multiplexed on 3 REGs, that is, 24 PHICH resources may be multiplexed into one CCE resource. Considering that the number of user equipments configured with a flexible subframe, and/or that the number of user equipments configured with aggregation of serving cells with different uplink to downlink subframe ratios are generally small, it is generally sufficient to reserve 1 to 2 CCE resources for the second PHICH resource set.

The network-side device may send signaling that carries an index of a CCE in which PHICH resources in the second PHICH resource set are located and a PHICH resource group number to the user equipment, so that the user equipment determines a location of a PHICH resource group in the second PHICH resource set in the acknowledgement subframe according to the CCE index and the PHICH resource group number. The network-side device may use radio resource control RRC signaling to carry signaling of the index of the CCE in which the PHICH resource in the second PHICH resource set is located and the PHICH resource group number; or use medium access control MAC signaling to carry signaling of the index of the CCE in which the PHICH resource in the second PHICH resource set is located and the PHICH resource group number; or the network-side device may further use the RRC signaling and the MAC signaling to carry the index of the CCE in which the PHICH resource in the second PHICH resource set is located and the PHICH resource group number, respectively; for example, the CCE index is carried in the RRC signaling and the PHICH resource group number is carried in the MAC signaling.

When the second PHICH resource set is reserved by using multiple CCE resources, each user equipment may be notified of some or all CCE indexes of these multiple CCEs, and one CCE index is notified preferably. Because one CCE is formed by 9 REGs, the 9 REGs of one CCE may be divided into 3 groups, each of which includes 3 REGs; the 8 PHICH resources multiplexed on the 3 REGs of each group are a group. Therefore, in addition to a CCE index, the network-side device may further signaling a PHICH resource group number within the second PHICH resource set through dedicated signaling such as RRC signaling or MAC signaling. When only one CCE index is notified, the user equipment may be notified of the PHICH resource group number through 2-bit dedicated RRC signaling or MAC signaling.

After receiving the index of the control channel element CCE in which the PHICH resource in the second PHICH resource set is located and the PHICH resource group number, the user equipment may determine, according to the CCE index and the PHICH resource group number, the location of the PHICH resource group in the second PHICH resource set in an acknowledgement subframe corresponding to uplink data sent according to the second subframe ratio information.

Further, when the network-side device sends a scheduling command to the user equipment, an orthogonal sequence index in a PHICH resource group in the second PHICH resource set may further be carried in an information field of the scheduling command; for example, the orthogonal sequence index in the PHICH resource group may be acquired through a 3-bit demodulation pilot cyclic shift field in the scheduling command, or by a modulus 8 operation of an index of a time frequency resource, such as a physical resource block, occupied by uplink data transmission; or the orthogonal sequence index in the PHICH resource group may be acquired by a modulus 8 operation of an index of a time frequency resource, such as a CCE, occupied by the scheduling command.

After receiving the scheduling command sent by the network-side device, the user equipment may determine a location of the PHICH resource in the PHICH resource group according to the orthogonal sequence index in the PHICH resource group in the second PHICH resource set, where the orthogonal sequence index is included in the scheduling command.

In summary, according to the index of the CCE in which the PHICH resource in the second PHICH resource set is located, the PHICH resource group number, and the orthogonal sequence index in the PHICH resource group, the network-side device may determine a PHICH resource, in the second PHICH resource set, for sending an acknowledgement, and the user equipment may further determine a PHICH resource, in the second PHICH resource set, for receiving the acknowledgement, that is, completing allocation of PHICH resources in the second PHICH resource set. After a PHICH resource in the second PHICH resource set is allocated, the network-side device may send a downlink second acknowledgement by using the PHICH resource and the user equipment may receive the downlink second acknowledgement by using the second PHICH resource set.

The following describes the embodiment of the present invention in detail by using an example of a scenario where first subframe ratio information and second subframe ratio information correspond to a same access cell that a user equipment accesses. In this embodiment, the first subframe ratio information may be any one of the subframe ratios shown in Table 1, or may be another subframe ratio newly defined in an LTE TDD evolution release. The second subframe ratio information may include flexible subframe information that a network-side device configures for the user equipment. This embodiment is described by using the second subframe ratio information of {D, S, U, F, F, D, S, U, F, F} as an example. Understandably, the embodiment of the present invention is also applicable to another manner for configuring a flexible subframe. In addition, it should be noted that in a same LTE TDD system, the manner for configuring a flexible subframe may be the same or may be different for different user equipments.

For uplink data sent by the user equipment according to the first subframe ratio information, both the network-side device and the user equipment may determine, according to a first timing relation (for example, the first timing relation shown in Table 2) and a subframe corresponding to the uplink data, an acknowledgement subframe corresponding to the uplink data. As can be seen from Table 2, when an uplink/downlink subframe ratio indicated by the first subframe ratio information is ratio 2 shown in Table 1, an acknowledgement subframe corresponding to uplink data transmission in subframe 2 is subframe 8 of the present radio frame; an acknowledgement subframe corresponding to uplink data transmission in subframe 7 is subframe 3 of the next radio frame; further, as can be seen from Table 3, $m_i$ corresponding to subframe 3 and $m_i$ corresponding to 8 are both 1; therefore, a first PHICH resource set exists in both subframe 3 and subframe 8.

Figure 4:
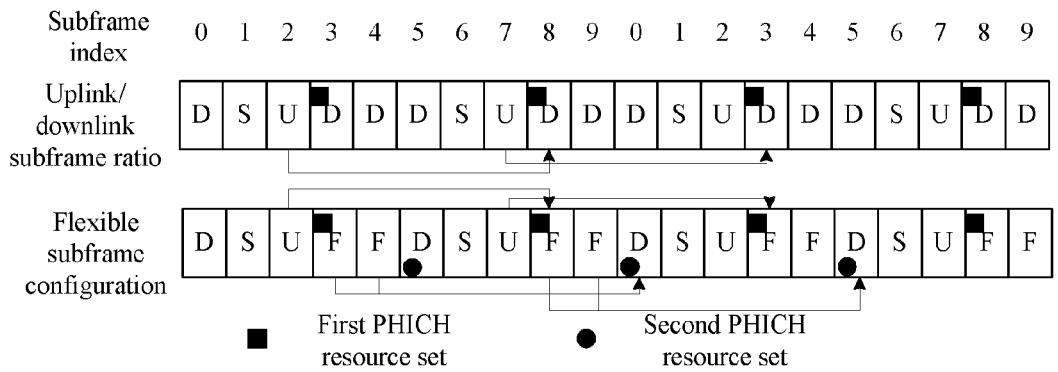
FIG. 4 is a schematic diagram of an acknowledgement subframe in an embodiment where a network-side device configures a flexible subframe for a user equipment according to the present invention.

The second subframe ratio is different from the first subframe ratio; therefore, according to the second timing relation shown in FIG. 4, for uplink data sent by the user equipment over uplink subframe 2 and uplink subframe 7, the network-side device may correspondingly feed back a corresponding acknowledgement to the user equipment over subframe 8 and subframe 3. Because the first PHICH resource set exists in both subframe 3 and subframe 8, the network-side device may send an acknowledgement to the user equipment over a PHICH resource in the first PHICH resource set in subframe 3 and subframe 8; for uplink data sent by the user equipment over flexible subframe 3 or flexible subframe 4, the network-side device may correspondingly feed back a corresponding acknowledgement to the user equipment over downlink subframe 0; for uplink data sent by the user equipment over flexible subframe 8 or flexible subframe 9, the network-side device may correspondingly feed back a corresponding acknowledgement to the user equipment over downlink subframe 5; as can be seen from Table 3, because the first PHICH resource set does not exist in downlink subframe 0 or downlink subframe 5, the network-side device may reserve a second PHICH resource set in subframe 0 and subframe 5, so that the network-side device may send the corresponding acknowledgement to the user equipment over a PHICH resource in the reserved second PHICH resource set in subframe 0 and subframe 5, as shown in FIG. 4.

Figure 5:
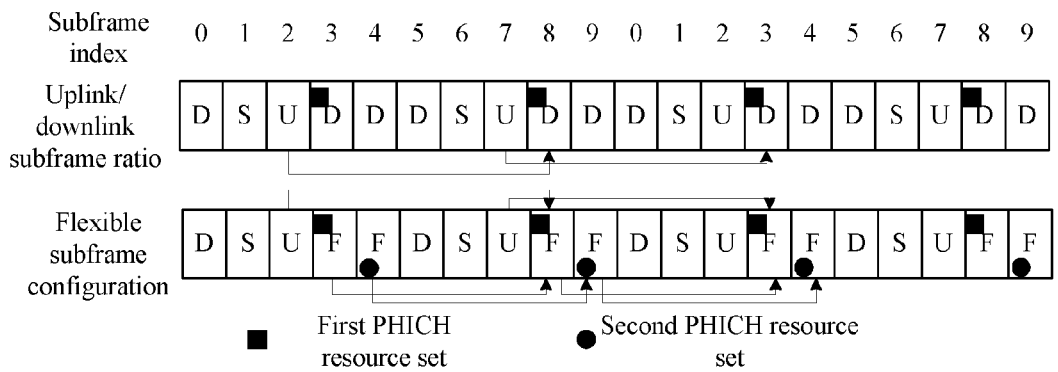
FIG. 5 is a schematic diagram of an acknowledgement subframe in another embodiment where a network-side device configures a flexible subframe for a user equipment according to the present invention.

If an acknowledgement subframe determined by another second timing relation is adopted, as shown in FIG. 5, for uplink data sent by the user equipment over uplink subframe 2 and uplink subframe 7, the network-side device may correspondingly feed back a corresponding acknowledgement to the user equipment over subframe 8 and subframe 3. Because the first PHICH resource set exists in both subframe 3 and subframe 8, the network-side device may send an acknowledgement to the user equipment over a PHICH resource in the first PHICH resource set in subframe 3 and subframe 8. For uplink data sent by the user equipment over subframe 3 according to the second subframe ratio information, a corresponding acknowledgement is received over flexible subframe 8 of the present radio frame; because subframe 8 has the first PHICH resource set, the network-side device may send the acknowledgement to the user equipment by using a PHICH resource in the first PHICH resource set in subframe 8; for uplink data sent by the user equipment over subframe 4 according to the second subframe ratio information, a corresponding acknowledgement is received over flexible subframe 9 of the present radio frame; because the first PHICH resource set does not exist in subframe 9, the network-side device may reserve the second PHICH resource set in subframe 9 and send the acknowledgement to the user equipment by using a PHICH resource in the reserved second PHICH resource set. For uplink data sent by the user equipment over flexible subframe 8, the network-side device may feed back a corresponding acknowledgement over subframe 3; because the first PHICH resource set exists in subframe 3, the network-side device may feed back the acknowledgement to the user equipment over a PHICH resource in the first PHICH resource set in subframe 3; for uplink data sent by the user equipment over flexible subframe 9, the network-side device may feed back a corresponding acknowledgement over subframe 4; because the first PHICH resource set does not exist in subframe 4, the network-side device may reserve the second PHICH resource set in subframe 4 and send the acknowledgement to the user equipment by using a PHICH resource in the reserved second PHICH resource set.

In the scenario where the first subframe ratio information and the second subframe ratio information correspond to a same access cell that the user equipment accesses, for a method for reserving the first PHICH resource set and the second PHICH resource set, reference may be made to the method for reserving the first PHICH resource set and the second PHICH resource set in the embodiment where the first subframe ratio information and the second subframe ratio information correspond to different access cells that the user equipment accesses, and no further details are provided herein.

Persons of ordinary skill in the art may understand that all or a part of the processes of the methods in the embodiments may be implemented by a computer program instructing relevant hardware. The program may be stored in a computer readable storage medium. When the program is run, the processes of the method embodiments are performed. The storage medium may be a magnetic disk, an optical disc, a read-only memory (Read-Only Memory, ROM), a random access memory (Read Access Memory, RAM), or the like.

Figure 6:
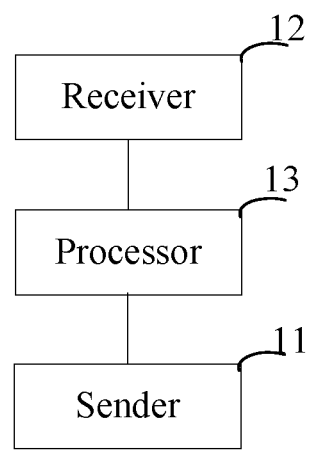
FIG. 6 is a schematic structural diagram of an embodiment of a network-side device for executing the method for sending an acknowledgement according to the present invention.

FIG. 6 is a schematic structural diagram of an embodiment of a network-side device for executing the method for sending an acknowledgement according to the present invention. As shown in FIG. 6, the network-side device includes: a sender 11, a receiver 12, and a processor 13, where:

the sender 11 is configured to send first subframe ratio information and second subframe ratio information to a user equipment, where subframe ratios represented by the first subframe ratio information and the second subframe ratio information are different;

the processor 13 is configured to determine a first acknowledgement subframe set according to a first timing relation that is set for the first subframe ratio information sent by the sender 11 and reserve a first physical hybrid automatic repeat request indicator channel PHICH resource set in an acknowledgement subframe of the first acknowledgement subframe set, and determine a second acknowledgement subframe set according to a second timing relation that is set for the second subframe ratio information sent by the sender 11 and reserve a second PHICH resource set in an acknowledgement subframe, in which the first PHICH resource set does not exist, of the second acknowledgement subframe set;

the receiver 12 is configured to receive uplink data sent by the user equipment according to the second subframe ratio information sent by the sender 11;

the processor 13 is further configured to determine, according to the second timing relation and a subframe for the uplink data received by the receiver 12, an acknowledgement subframe for the uplink data received by the receiver 12; and the sender 11 is further configured to: if the first physical hybrid automatic repeat request indicator channel PHICH resource set exists in the acknowledgement subframe determined by the processor 13, send an acknowledgement to the user equipment by using a PHICH resource in the first PHICH resource set reserved by the processor 13; if the first PHICH resource set does not exist in the acknowledgement subframe determined by the processor 13, send an acknowledgement to the user equipment by using a PHICH resource in the second PHICH resource set reserved by the processor 13.

The present invention further provides another embodiment of a network-side device. As a feasible implementation manner, the first subframe ratio information sent by the sender 11 to the user equipment corresponds to a first serving cell that the user equipment accesses, and the second subframe ratio information sent by the sender 11 to the user equipment corresponds to a second serving cell that the user equipment accesses;

correspondingly, the receiver 12 may be specifically configured to receive the uplink data in the second serving cell; and the sender may be specifically configured to send, in the first serving cell, the acknowledgement to the user equipment.

As another feasible implementation manner, the first subframe ratio information and the second subframe ratio information sent by the sender 11 to the user equipment may also correspond to a same serving cell that the user equipment accesses, where:

neither the first subframe ratio information nor the second subframe ratio information sent by the sender 11 to the user equipment includes flexible subframe information; or the first subframe ratio information sent by the sender 11 to the user equipment does not include flexible subframe information, and the second subframe ratio information includes flexible subframe information.

In addition, the sender 11 may be further configured to send signaling that carries an index of a CCE in which a PHICH resource in the second PHICH resource set is located and a PHICH resource group number to the user equipment, so that the user equipment determines a location of a PHICH resource group in the second PHICH resource set in the acknowledgement subframe according to the CCE index and the PHICH resource group number, where the signaling sent by the sender 11 may be radio resource control RRC signaling and/or medium access control MAC signaling.

The sender 11 may be further configured to send a scheduling command to the user equipment, where the scheduling command includes an orthogonal sequence index in a PHICH resource group in the second PHICH resource set, so that the user equipment determines a location of a PHICH resource in the PHICH resource group according to the orthogonal sequence index.

Correspondingly, the processor 13 may be further configured to determine, according to the index of the CCE in which the PHICH resource in the second PHICH resource set is located, the PHICH resource group number, and the orthogonal sequence index, a PHICH resource, in the second PHICH resource set in the acknowledgement subframe, for sending an acknowledgement.

The network-side device provided in the embodiment of the present invention corresponds to the method for sending an acknowledgement provided in the embodiment of the present invention and is an executing device for sending the acknowledgement; for a detailed procedure of implementing the method for sending the acknowledgement, reference may be made to the method embodiment, and no further details are provided herein.

According to the network-side device provided in this embodiment, when the network-side device delivers different subframe ratios to a user equipment, the network-side device sends, if an existing PHICH resource set exists in an acknowledgement subframe, an acknowledgement to the user equipment over the existing PHICH resource set, or sends, if no existing PHICH resource set exists in the acknowledgement subframe, an acknowledgement to the user equipment over a reserved PHICH resource set. When cross-carrier scheduling is performed between serving cells with different subframe ratios, or a new subframe ratio is introduced for a new function, the embodiment of the present invention can effectively lower PHICH resource overhead of a system and ensure data transmission for a user equipment.

Figure 7:
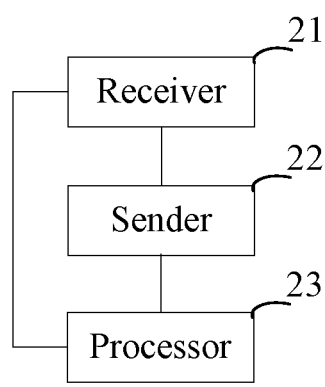
FIG. 7 is a schematic structural diagram of an embodiment of a user equipment for executing the method for receiving an acknowledgement according to the present invention.

FIG. 7 is a schematic structural diagram of an embodiment of a user equipment for executing the method for receiving an acknowledgement according to the present invention. As shown in FIG. 7, the user equipment includes: a receiver 21, a sender 22, and a processor 23, where:

the receiver 21 is configured to receive first subframe ratio information and second subframe ratio information that are sent by a network-side device, where subframe ratios represented by the first subframe ratio information and the second subframe ratio information are different;

the sender 22 is configured to send uplink data to the network-side device according to the second subframe ratio information received by the receiver 21;

the processor 23 is configured to determine an acknowledgement subframe for the uplink data according to a second timing relation that is set for the second subframe ratio information received by the receiver 21 and a subframe for sending the uplink data; and the receiver 21 may be further configured to: if the acknowledgement subframe determined by the processor 23 is a subframe in which a first physical hybrid automatic repeat request indicator channel PHICH resource set exists, receive, by using a PHICH resource in the first PHICH resource set, an acknowledgement sent by the network-side device; if the acknowledgement subframe determined by the processor 23 is a subframe in which the first PHICH resource set does not exist, receive, by using a PHICH resource in a reserved second PHICH resource set, an acknowledgement sent by the network-side device, where existence of the first PHICH resource set is determined by the processor 23 according to a first timing relation that is set for the first subframe ratio.

On the basis of the embodiment of the user equipment provided in the foregoing, as a feasible implementation manner, the first subframe ratio information received by the receiver 21 may correspond to a first serving cell that the user equipment accesses; and the second subframe ratio information received by the receiver 21 may correspond to a second serving cell that the user equipment accesses;

correspondingly, the sender 22 may be specifically configured to send uplink data in the second serving cell to the network-side device; and the receiver 21 may be specifically configured to receive, in the first serving cell, an acknowledgement sent by the network-side device.

As another feasible implementation manner, the first subframe ratio information and the second subframe ratio information that are received by the receiver 21 may further correspond to a same serving cell that the user equipment accesses, where:

neither the first subframe ratio information nor the second subframe ratio information received by the receiver 21 may include flexible subframe information; or the first subframe ratio information received by the receiver 21 does not include flexible subframe information, and the second subframe ratio information received by the receiver 21 may include flexible subframe information.

Further, the receiver 21 may be further configured to receive signaling that is sent by the network-side device and carries an index of a CCE in which a PHICH resource in a second PHICH resource set is located and a PHICH resource group number, where the signaling received by the receiver 21 may be radio resource control RRC signaling and/or medium access control MAC signaling; and correspondingly, the processor 23 may be further configured to determine a location of a PHICH resource group in the second PHICH resource set in the acknowledgement subframe according to the CCE index and the PHICH resource group number.

The receiver 21 may be further configured to receive a scheduling command sent by the network-side device, where the scheduling command includes an orthogonal sequence index in a PHICH resource group in the second PHICH resource set; and correspondingly, the processor 23 may be further configured to determine a location of a PHICH resource in the PHICH resource group according to the orthogonal sequence index.

The user equipment provided in the embodiment of the present invention corresponds to the method for receiving an acknowledgement provided in the embodiment of the present invention and is an executing device for receiving the acknowledgement; for a detailed procedure of implementing the method for receiving the acknowledgement, reference may be made to the method embodiment, and no further details are provided herein.

According to the user equipment provided in this embodiment, when the user equipment receives different subframe ratios delivered by a network-side device, the network-side device sends, if an existing PHICH resource set exists in an acknowledgement subframe, an acknowledgement to the user equipment over the existing PHICH resource set, or sends, if no existing PHICH resource set exists in the acknowledgement subframe, an acknowledgement to the user equipment over a reserved PHICH resource set. When cross-carrier scheduling is performed between serving cells with different subframe ratios, or a new subframe ratio is introduced for a new function, the embodiment of the present invention can effectively lower a PHICH resource overhead of a system and ensure data transmission for a user equipment.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as the modifications and replacements do not cause the essence of corresponding technical solutions to depart from the spirit and scope of the technical solutions of the embodiments of the present invention.

What is claimed is:

1. A method for sending an acknowledgement, comprising:
    sending, by a network-side device, subframe ratio information including first subframe ratio information and second subframe ratio information to a user equipment, wherein subframe ratios represented by the first subframe ratio information and the second subframe ratio information are different, and wherein the subframe ratio information is used to determine a subframe type for each subframe within a radio frame, each radio frame includes a preset number of subframes, and a timing relationship between a subframe for the user equipment to transmit uplink data and a subframe for the network-side device to transmit physical hybrid automatic repeat request indicator channel (physical HARQ indicator channel (PHICH)) is determined according to the subframe ratio information;
    determining, by the network-side device, a first acknowledgement subframe set according to a first timing relationship set for the first subframe ratio information, and reserving a first physical hybrid automatic repeat request indicator channel PHICH resource set in an acknowledgement subframe of the first acknowledgement subframe set;
    determining, by the network-side device, a second acknowledgement subframe set according to a second timing relationship set for the second subframe ratio information, and reserving a second PHICH resource set in an acknowledgement subframe, in which the first PHICH resource set does not exist, of the second acknowledgement subframe set;
    receiving, by the network-side device, uplink data sent by the user equipment according to the second subframe ratio information;
    determining, by the network-side device, an acknowledgement subframe for the uplink data according to the second timing relationship and a subframe for receiving the uplink data; and
    sending, by the network-side device by using a PHICH resource in the first PHICH resource set, an acknowledgement to the user equipment if the first PHICH resource set exists in the determined acknowledgement subframe for the uplink data, and sending, by the network-side device by using a PHICH resource in the second PHICH resource set, the acknowledgement to the user equipment if the first PHICH resource set does not exist in the acknowledgement subframe.

2. The method according to claim 1, wherein:
the first subframe ratio information corresponds to a first serving cell that the user equipment accesses, and the second subframe ratio information corresponds to a second serving cell that the user equipment accesses; and the uplink data is received in the second serving cell by the network-side device; and the acknowledgement is sent in the first serving cell by the network-side device to the user equipment; or the first subframe ratio information and the second subframe ratio information correspond to a same serving cell that the user equipment accesses, wherein: neither the first subframe ratio information nor the second subframe ratio information comprises flexible subframe information; or the first subframe ratio information does not comprise flexible subframe information, and the second subframe ratio information comprises flexible subframe information.

3. The method according to claim 1, after the sending, by a network-side device, first subframe ratio information and second subframe ratio information to a user equipment, further comprising:
sending, by the network-side device, signaling that carries an index of a control channel element (CCE) in which a PHICH resource in the second PHICH resource set is located and a PHICH resource group number to the user equipment, so that the user equipment determines a location of a PHICH resource group in the second PHICH resource set in the acknowledgement subframe according to the CCE index and the PHICH resource group number, wherein the signaling is radio resource control RRC signaling and/or medium access control (MAC) signaling.

4. The method according to claim 3, before the receiving, by the network-side device, uplink data sent by the user equipment according to the second subframe ratio information, further comprising:
sending, by the network-side device, a scheduling command to the user equipment, wherein the scheduling command comprises an orthogonal sequence index in a PHICH resource group in the second PHICH resource set, so that the user equipment determines a location of a PHICH resource in the PHICH resource group according to the orthogonal sequence index.

5. The method according to claim 4, before the sending, by the network-side device by using a PHICH resource in the second PHICH resource set, an acknowledgement to the user equipment, further comprising:
determining, by the network-side device according to the index of the CCE in which the PHICH resource in the second PHICH resource set is located, the PHICH resource group number, and the orthogonal sequence index, a PHICH resource, in the second PHICH resource set in the acknowledgement subframe, for sending the acknowledgement.

6. A method for receiving an acknowledgement, comprising:
receiving, by a user equipment, subframe ratio information including first subframe ratio information and second subframe ratio information that are sent by a network-side device, wherein subframe ratios represented by the first subframe ratio information and the second subframe ratio information are different, and wherein the subframe ratio information is used to determine a subframe type for each subframe within a radio frame, each radio frame includes a preset number of subframes, and a timing relationship between a subframe for the user equipment to transmit uplink data and a subframe for the network-side device to transmit physical hybrid automatic repeat request indicator channel (physical HARQ indicator channel (PHICH) is determined according to the subframe ratio information;

sending, by the user equipment, uplink data to the network-side device according to the second subframe ratio information;

determining, by the user equipment, an acknowledgement subframe for the uplink data according to a second timing relationship set for the second subframe ratio information and a subframe for sending the uplink data; and if the acknowledgement subframe is a subframe in which a first physical hybrid automatic repeat request indicator channel PHICH resource set exists, receiving, by the user equipment by using a PHICH resource in the first PHICH resource set, an acknowledgement sent by the network-side device; if the acknowledgement subframe is a subframe in which the first PHICH resource set does not exist, receiving, by the user equipment by using a PHICH resource in a reserved second PHICH resource set, the acknowledgement sent by the network-side device, wherein the subframe in which the first PHICH resource set exists is determined by the user equipment according to a first timing relationship set for the first subframe ratio.

7. The method according to claim 6, wherein:
the first subframe ratio information corresponds to a first serving cell that the user equipment accesses, and the second subframe ratio information corresponds to a second serving cell that
the user equipment accesses; and the uplink data is sent in the second serving cell by the user equipment to the network-side device; and the acknowledgement is received in the first serving cell by the user equipment; or the first subframe ratio information and the second subframe ratio information correspond to a same serving cell that the user equipment accesses, wherein: neither the first subframe ratio information nor the second subframe ratio information comprises flexible subframe information; or the first subframe ratio information does not comprise flexible subframe information, and the second subframe ratio information comprises flexible subframe information.

8. The method according to claim 6, after the receiving, by a user equipment, first subframe ratio information and second subframe ratio information that are sent by a network-side device, further comprising:
receiving, by the user equipment, signaling sent by the network-side device and carries an index of a control channel element (CCE) in which a PHICH resource in the second PHICH resource set is located and a PHICH resource group number, wherein the signaling is radio resource control RRC signaling and/or medium access control (MAC) signaling; and determining, by the user equipment, a location of a PHICH resource group in the second PHICH resource set in the acknowledgement subframe according to the CCE index and the PHICH resource group number.

9. The method according to claim 8, before the sending, by the user equipment, uplink data to the network-side device according to the second subframe ratio information, further comprising:
receiving, by the user equipment, a scheduling command sent by the network-side device, wherein the scheduling command comprises an orthogonal sequence index in a PHICH resource group in the second PHICH resource set; and
determining, by the user equipment, a location of a PHICH resource in the PHICH resource group according to the orthogonal sequence index.

10. A network-side device, comprising:
a sender, configured to send subframe ratio information including first subframe ratio information and second subframe ratio information to a user equipment, wherein subframe ratios represented by the first subframe ratio information and the second subframe ratio information are different, and wherein the subframe ratio information is used to determine a subframe type for each subframe within a radio frame, each radio frame includes a preset number of subframes, and a timing relationship between a subframe for the user equipment to transmit uplink data and a subframe for the network-side device to transmit physical hybrid automatic repeat request indicator channel (physical HARQ indicator channel (PHICH) is determined according to the subframe ratio information;
a processor, configured to determine a first acknowledgement subframe set according to a first timing relationship set for the first subframe ratio information sent by the sender and reserve a first physical hybrid automatic repeat request indicator channel PHICH resource set in an acknowledgement subframe of the first acknowledgement subframe set, or determine a second acknowledgement subframe set according to a second timing relationship set for the second subframe ratio information sent by the sender and reserve a second PHICH resource set in an acknowledgement subframe, in which the first PHICH resource set does not exist, of the second acknowledgement subframe set; and
a receiver, configured to receive uplink data sent by the user equipment according to the second subframe ratio information sent by the sender; wherein:
the processor is further configured to determine, according to the second timing relationship and a subframe for the uplink data received by the receiver, an acknowledgement subframe for the uplink data received by the receiver; and
the sender is further configured to, if the first PHICH resource set exists in the acknowledgement subframe determined by the processor, send an acknowledgement to the user equipment by using a PHICH resource in the first PHICH resource set reserved by the processor; if the first PHICH resource set does not exist in the acknowledgement subframe determined by the processor, send the acknowledgement to the user equipment by using a PHICH resource in the second PHICH resource set reserved by the processor.

11. The network-side device according to claim 10, wherein:
the first subframe ratio information sent by the sender to the user equipment corresponds to a first serving cell that the user equipment accesses, and the second subframe ratio information sent by the sender to the user equipment corresponds to a second serving cell that the user equipment accesses; the receiver is specifically configured to receive the uplink data in the second serving cell; and the sender is specifically configured to send, in the first serving cell, the acknowledgement to the user equipment; or
the first subframe ratio information and the second subframe ratio information that are sent by the sender to the user equipment correspond to a same serving cell that the user equipment accesses, wherein: neither the first subframe ratio information nor the second subframe ratio information sent by the sender to the user equipment comprises flexible subframe information; or the first subframe ratio information sent by the sender to the user equipment does not comprise flexible subframe information, and the second subframe ratio information comprises flexible subframe information.

12. The network-side device according to claim 11, wherein the sender is further configured to send signaling that carries an index of a control channel element (CCE) in which a PHICH resource in the second PHICH resource set is located and a PHICH resource group number to the user equipment, so that the user equipment determines a location of a PHICH resource group in the second PHICH resource set in the acknowledgement subframe according to the CCE index and the PHICH resource group number, wherein the signaling is radio resource control RRC signaling and/or medium access control (MAC) signaling.

13. The network-side device according to claim 12, wherein the sender is further configured to send a scheduling command to the user equipment, wherein the scheduling command comprises an orthogonal sequence index in a PHICH resource group in the second PHICH resource set, so that the user equipment determines a location of a PHICH resource in the PHICH resource group according to the orthogonal sequence index.

14. The network-side device according to claim 13, wherein the processor is further configured to determine, according to the index of the CCE in which the PHICH resource in the second PHICH resource set is located, the PHICH resource group number, and the orthogonal sequence index, a PHICH resource, in the second PHICH resource set in the acknowledgement subframe, for sending the acknowledgement.

15. A user equipment, comprising:
a receiver, configured to receive subframe ratio information including first subframe ratio information and second subframe ratio information that are sent by a network-side device, wherein subframe ratios represented by the first subframe ratio information and the second subframe ratio information are different, and wherein the subframe ratio information is used to determine a subframe type for each subframe within a radio frame, each radio frame includes a preset number of subframes, and a timing relationship between a subframe for the user equipment to transmit uplink data and a subframe for the network-side device to transmit physical hybrid automatic repeat request indicator channel (physical HARQ indicator channel (PHICH) is determined according to the subframe ratio information;
a sender, configured to send uplink data to the network-side device according to the second subframe ratio information received by the receiver; and
a processor, configured to determine an acknowledgement subframe for the uplink data according to a second timing relationship set for the second subframe ratio information received by the receiver and a subframe for sending the uplink data; wherein:

the receiver is further configured to, if the acknowledgement subframe determined by the processor is a subframe in which a first physical hybrid automatic repeat request indicator channel PHICH resource set exists, receive, by using a PHICH resource in the first PHICH resource set, an acknowledgement sent by the network-side device; if the acknowledgement subframe determined by the processor is a subframe in which the first PHICH resource set does not exist, receive, by using a PHICH resource in a reserved second PHICH resource set, the acknowledgement sent by the network-side device, wherein the subframe in which the first PHICH resource set exists is determined by the processor according to a first timing relationship set for the first subframe ratio.

16. The user equipment according to claim 15, wherein:
the first subframe ratio information received by the receiver corresponds to a first serving cell that the user equipment accesses, and the second subframe ratio information received by the receiver corresponds to a second serving cell that the user equipment accesses; the sender is specifically configured to send, in the second serving cell, the uplink data to the network-side device; and the receiver is specifically configured to receive, in the first serving cell, the acknowledgement sent by the network-side device; or
the first subframe ratio information and the second subframe ratio information that are received by the receiver correspond to a same serving cell that the user equipment accesses, wherein: neither the first subframe ratio information nor the second subframe ratio information received by the receiver comprises flexible subframe information; or the first subframe ratio information received by the receiver does not comprise flexible subframe information, and the second subframe ratio information received by the receiver comprises flexible subframe information.

17. The user equipment according to claim 15, wherein the receiver is further configured to receive signaling sent by the network-side device and carries an index of a control channel element (CCE) in which a PHICH resource in the second PHICH resource set is located and a PHICH resource group number, wherein the signaling is radio resource control RRC signaling and/or medium access control (MAC) signaling; and
the processor is further configured to determine a location of a PHICH resource group in the second PHICH resource set in the acknowledgement subframe according to the CCE index and the PHICH resource group number.

18. The user equipment according to claim 17, wherein the receiver is further configured to receive a scheduling command sent by the network-side device, wherein the scheduling command comprises an orthogonal sequence index in a PHICH resource group in the second PHICH resource set; and
the processor is further configured to determine a location of a PHICH resource in the PHICH resource group according to the orthogonal sequence index.

* * * * *